United States Patent
Dress

(10) Patent No.: US 11,184,290 B2
(45) Date of Patent: Nov. 23, 2021

(54) PRIORITY-BASED ARBITRATION FOR PARALLEL MULTICAST ROUTING WITH SELF-DIRECTED DATA PACKETS

(71) Applicant: Lightfleet Corporation, Camas, WA (US)

(72) Inventor: William Dress, Camas, WA (US)

(73) Assignee: Lightfleet Corporation, Camas, WA (US)

( * ) Notice: Subject to any disclaimer, the term of this patent is extended or adjusted under 35 U.S.C. 154(b) by 0 days.

(21) Appl. No.: 16/947,331

(22) Filed: Jul. 28, 2020

(65) Prior Publication Data

US 2020/0358709 A1 Nov. 12, 2020

Related U.S. Application Data

(63) Continuation-in-part of application No. 16/799,774, filed on Feb. 24, 2020, and a continuation-in-part of application No. 16/447,844, filed on Jun. 20, 2019, now abandoned, and a continuation-in-part of application No. PCT/US2019/031052, filed on May 7, 2019, and a continuation-in-part of application No. 15/997,573, filed on Jun. 4, 2018, now abandoned, said application No. 16/799,774 is a continuation-in-part of application No. 15/175,685, filed on Jun. 7, 2016, now abandoned, and a continuation-in-part of application No. 15/262,391, filed on Sep. 12, 2016, now abandoned, application No. 16/947,331, which is a continuation-in-part of application No. 15/262,402, filed on Sep. 12, 2016, now abandoned, which is a continuation of application No. 15/175,685, filed on Jun. 7, 2016, now abandoned.

(60) Provisional application No. 62/687,785, filed on Jun. 20, 2018, provisional application No. 62/241,112, filed on Oct. 13, 2015, provisional application No.
(Continued)

(51) Int. Cl.
H04L 12/44 (2006.01)
H04L 12/863 (2013.01)

(52) U.S. Cl.
CPC .............. H04L 47/50 (2013.01); H04L 12/44 (2013.01)

(58) Field of Classification Search
None
See application file for complete search history.

(56) References Cited

U.S. PATENT DOCUMENTS

2002/0176431 A1* 11/2002 Golla ..................... H04L 49/254
370/412
2007/0248097 A1* 10/2007 Boucard ............... H04L 49/254
370/394

(Continued)

Primary Examiner — Gregory B Sefcheck
Assistant Examiner — Amarnauth G Persaud
(74) Attorney, Agent, or Firm — Schultz & Associates, P.C.

(57) ABSTRACT

A parallel multicast star topology data network includes a plurality of input buffers, a first arbitration mechanism coupled to the plurality of input buffers, a plurality of output buffers coupled to the first arbitration mechanism and a plurality of interconnect exits coupled to the plurality of output buffers. When packet contents of a multicast message are ready for release from the first arbitration mechanism then all of the packet contents are substantially simultaneously released to the plurality of output buffers and then substantially simultaneously to the plurality of interconnect exits.

11 Claims, 11 Drawing Sheets

Related U.S. Application Data

62/217,001, filed on Sep. 10, 2015, provisional application No. 62/217,003, filed on Sep. 10, 2015, provisional application No. 62/217,004, filed on Sep. 10, 2015.

(56) References Cited

U.S. PATENT DOCUMENTS

| | | | | |
|---|---|---|---|---|
| 2008/0008471 A1* | 1/2008 | Dress | | H01J 17/34 |
| | | | | 398/66 |
| 2014/0098816 A1* | 4/2014 | Matthews | | H04L 49/00 |
| | | | | 370/390 |
| 2014/0314099 A1* | 10/2014 | Dress | | H04L 49/15 |
| | | | | 370/422 |
| 2015/0037036 A1* | 2/2015 | Dress | | H04B 10/27 |
| | | | | 398/66 |
| 2017/0078367 A1* | 3/2017 | Dress | | H04L 67/104 |

* cited by examiner

US 11,184,290 B2

PRIORITY-BASED ARBITRATION FOR PARALLEL MULTICAST ROUTING WITH SELF-DIRECTED DATA PACKETS

CROSS-REFERENCE TO RELATED APPLICATIONS

This application is a continuation-in-part of U.S. application Ser. No. 16/447,844, filed on Jun. 20, 2019, which claims priority benefit from U.S. Provisional Application No. 62/687,785, filed on Jun. 20, 2018, and is a continuation-in-part of PCT/US2019/031052, filed on May 7, 2019 and is a continuation of U.S. application Ser. No. 15/997,573, filed on Jun. 4, 2018. This application is a continuation-in-part of U.S. application Ser. No. 16/799,774, filed on Feb. 24, 2020, which is a continuation-in-part of U.S. application Ser. No. 15/175,685, filed on Jun. 7, 2016, and is a continuation-in-part of U.S. application Ser. No. 15/262,391, filed Sep. 12, 2016. This application is a continuation-in-part of U.S. application Ser. No. 15/262,402, filed on Sep. 12, 2016, which is a continuation of U.S. application Ser. No. 15/175,685, filed on Jun. 7, 2016, which claims priority benefit from U.S. Provisional Application No. 62/217,001, filed on Sep. 10, 2015, and U.S. Provisional Application No. 62/217,003, filed on Sep. 10, 2015, and U.S. Provisional Application No. 62/217,004, filed on Sep. 10, 2015 and U.S. Provisional Application No. 62/241,112, filed on Oct. 13, 2015. The patent applications identified above are incorporated here by reference in its entirety to provide continuity of disclosure.

BACKGROUND OF THE INVENTION

Today's interconnect technology operates on a simple time-ordered method with round-robin techniques to choose between multiple simultaneous inputs directed to the same output. While adequate for unicast and equivalent sequential multicast messages, this method can result in unacceptable delays for parallel (true) multicast operations in the presence of unicast messages directed to a common exit. The situation may be even worse for sequential multicast operations which are then delayed by incoming unicast messages while the multicast process is in progress. Note that this also leads to reduced multicast efficiency and a potentially large jitter between actual delivery times of the multicast collective.

SUMMARY OF THE INVENTION

According to an embodiment of the present disclosure, a process comprises operating a parallel multicast star topology data network including a plurality of input buffers, a first arbitration mechanism coupled to the plurality of input buffers, a plurality of output buffers coupled to the first arbitration mechanism and a plurality of interconnect exits coupled to the plurality of output buffers, releasing substantially simultaneously all packet contents of a multicast message to the plurality of output buffers when all packet contents are ready for release from the first arbitration mechanism; and then releasing substantially simultaneously all packet contents of the multicast message from the plurality of output buffers to the plurality of interconnect exits.

According to another embodiment of the present disclosure, an apparatus comprises a parallel multicast star topology data network including a plurality of input buffers, a first arbitration mechanism coupled to the plurality of input buffers, a plurality of output buffers coupled to the first arbitration mechanism and a plurality of interconnect exits coupled to the plurality of output buffers, wherein when packet contents of a multicast message are ready for release from the first arbitration mechanism then all of the packet contents are substantially simultaneously released to the plurality of output buffers and then substantially simultaneously to the plurality of interconnect exits.

BRIEF DESCRIPTION OF THE DRAWINGS

In the detailed description of the preferred embodiments presented below, reference is made to the accompanying drawings.

DETAILED DESCRIPTION OF THE INVENTION

Figure 1:
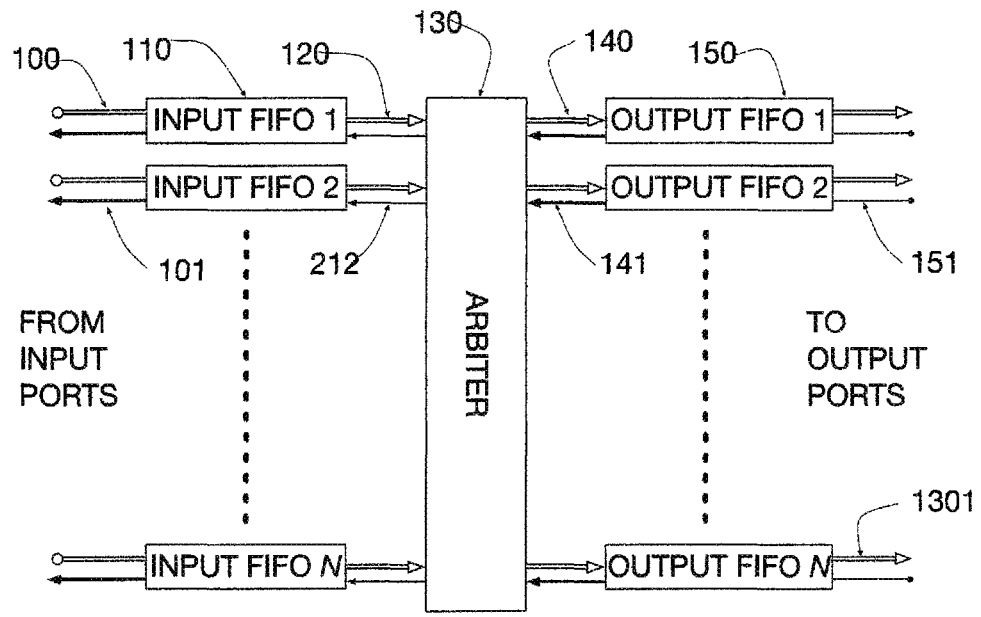
FIG. 1 illustrates an arbitration mechanism in reference to input and output mechanisms.

In the description that follows, like parts are marked throughout the specification and figures with the same numerals, respectively. The figures are not necessarily drawn to scale and may be shown in exaggerated or generalized form in the interest of clarity and conciseness.

Embodiments of this disclosure relate to computer and signal network fabric interconnects. More particularly, the embodiments of this disclosure are approaches to effecting a fair distribution of incoming information, whether unicast or multicast transmissions, in the presence of multiple inputs to the same destination or interconnect exits. The embodiments of this disclosure specifically address true or parallel multicast transmissions.

There are several non-equivalent approaches to sharing exit-port access between unicast and parallel multicast transmissions. The embodiments of the disclosure give equal consideration to parallel multicast messages on a fair arrival-time basis as well as competing unicast messages. In addition, embodiments of the disclosure markedly increase the efficiency (reduce latency) of multicast operations and reduce delivery-time jitter to a negligible amount.

The concept of and desire for true, parallel multicast was set-aside decades ago when Ethernet connectivity and its star topology replaced the even older broadband bus. The need for parallel multicast remained but its advantages were all but forgotten due to the more favorable cost and maintenance advantages of the Ethernet connectivity technology. To make-up for the lack of true multicast, Ethernet implementations offer a sequential approach wherein a packet is replicated in the interconnect and sent out serially to multiple endpoints, interrupting the smooth flow of data offered by the wormhole method of packet routing. This sequential Ethernet method introduced a store-and-forward technology (sequential) when encountering multicast packets. Such a store and forward work-around introduces excessive latency into the Ethernet transmissions and produces an unfortunate skew in arrival times of the same information at multiple destinations.

In the intervening period since the setting-aside of bus-based interconnects, the advantages offered by true parallel multicast were ignored and, subsequently, largely forgotten in spite of the awkward Ethernet work-arounds now accepted as standard. Recently, however, the important advantages of true parallel multicast are starting to be rediscovered.

The embodiments of the disclosure relate generally to providing fair arbitration between competing inputs to a computer interconnect. The concept for fair arbitration of competing unicast and multicast transmissions presented in this disclosure is an efficient technology for achieving true, parallel multicast.

"Arbitration" in the context of this disclosure is intended to mean that a message or packet received by the interconnect device concurrently with other packets receives "fair" treatment in that its release to the desired output ports is not unduly delayed nor pre-empted by later-arriving transmissions and that neither unicast nor multicast transmissions are given preference one over the other. That is, the temporal order of incoming packets is maintained to within the scan time of the arbitration mechanism. The embodiments disclosed herein provide release criteria consistent with the fairness principle while improving the latency of the process.

By convention, values of single-bit registers or signals represent logical "true", the integer 1, or "set" when the bit is set to 1 and "false", the integer 0, or "clear" when the bit is set to 0. The context of the diagram determines the semantics of the signal and its effect.

It will be understood that the diagrams presented in this disclosure primarily concern the logic of operation by describing the signals, devices, and connections required to achieve the desired arbitration and do not include dynamic or timing considerations which more properly belong to a particular implementation of the concepts presented. Timing constraints imposed by a particular implementation may require additional circuit components to the ones referenced in the drawings, but this will not require undue experimentation for one of skill in the art of signal networking.

FIG. 1 is an overview of the "multiflo" interconnect based on the new method of arbitration. For clarity, only the components and devices participating in the arbitration between incoming packets or messages are shown. The necessary input and output circuitry and devices, although mentioned, are not illustrated in FIG. 1.

Parallel data bus 100 carries "flits" or 64-bit words in the preferred implementation. These flits are typically assembled from serial pulse streams (not shown) that are prepared by the interconnect's input circuitry to several input FIFOs 110, while back pressure to the input units for flow control is provided by lines 101. The interconnect in question is assumed to have n input and n output channels resulting in an n×n or radix-n interconnect.

Arbiter 130 is a single-priority channel. An interconnect supporting multiple priorities requires multiple parallel devices such as the one illustrated in FIG. 1. A fan-out in the input modules serves as entry to each of several input FIFOs for each priority pathway. Data buses 120 connect input FIFOs 110 to the arbiter, while signals 212 from arbiter 130 command their respective input FIFOs 110 to advance. Data buses 140 connect each input FIFO 110 through arbiter 130 to their respective output FIFOs 150. Signals 141 from output FIFOs 150 contain necessary control information concerning the state of output FIFOs 150. Signal lines 151 convey status of the output ports (not shown) back to output FIFOs 150 for purposes of flow control. Finally, buses 1301 from output FIFOs 150 to the output ports (not shown) complete the description of the flow of information within the interconnect from input to output.

Figure 2:
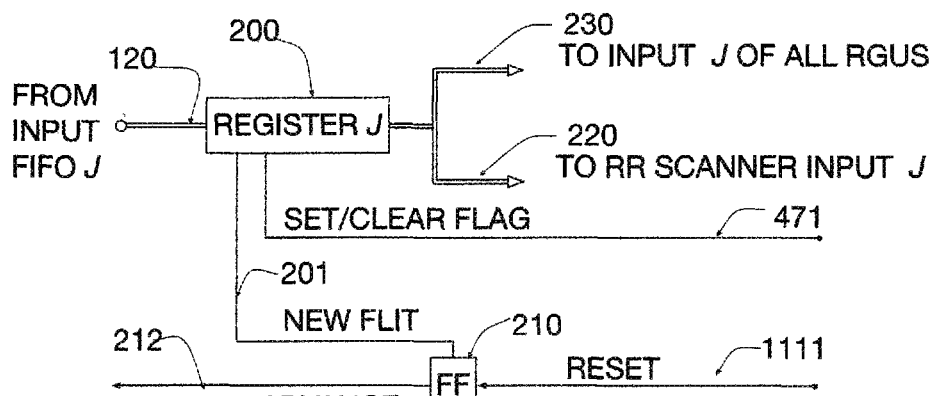
FIG. 2 is a diagram of an arbiter register for a particular input.

FIG. 2 shows a typical input register 200 in arbiter 130 that is connected to the output of input FIFOs 110 via data bus 120. There are n such registers in a radix-n interconnect. Each input register 200 is connected directly to a register in the release-gate units (RGUs) via bus 230 and to the round robin ("RR") scanner via bus 220. A new flit written to input register 200 asserts line 201 which sets flip flop 210. When this flip flop is reset by asserting line 1111 from the bit memory (below), flip flop 210 is reset, asserting line 212 to command the receiving FIFOs 110 to advance. Line 471 from input register 200 controls flag 300.

Figure 3:
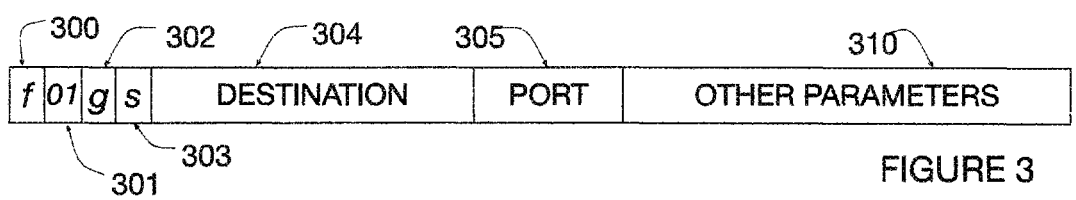
FIG. 3 shows fields of an arbiter input register.

FIG. 3 shows a possible configuration of the fields of input register 200. There are many other possible configurations and embodiments of this disclosure which are not limited to the configuration shown in FIG. 3. Flag 300 is the high bit of the register. This bit location is not present on data bus 120 although all other fields in input register 200 are present on data buses 100, 120 and 140 and throughout the device. In particular, the 2-bit type field 301 contains the bit pattern "01" when input FIFOs 110 and the aforementioned bus complex contains a packet header introducing a sequence of data flits to follow. "G" bit 302, when set, indicates that the packet is to be sent to all members of a multicast group. "S" bit 303 requests a synchronous release for a multicast group. Destination field 304 specifies the multicast group index when g bit 302 is set and a unicast or a single point destination when that bit is clear. Port field 305 contains the index of the input port and is inserted into the header flit by the input mechanism (not shown). Other parameters 310 not required by embodiments of this disclosure are transmitted in the bit field.

Figure 4:
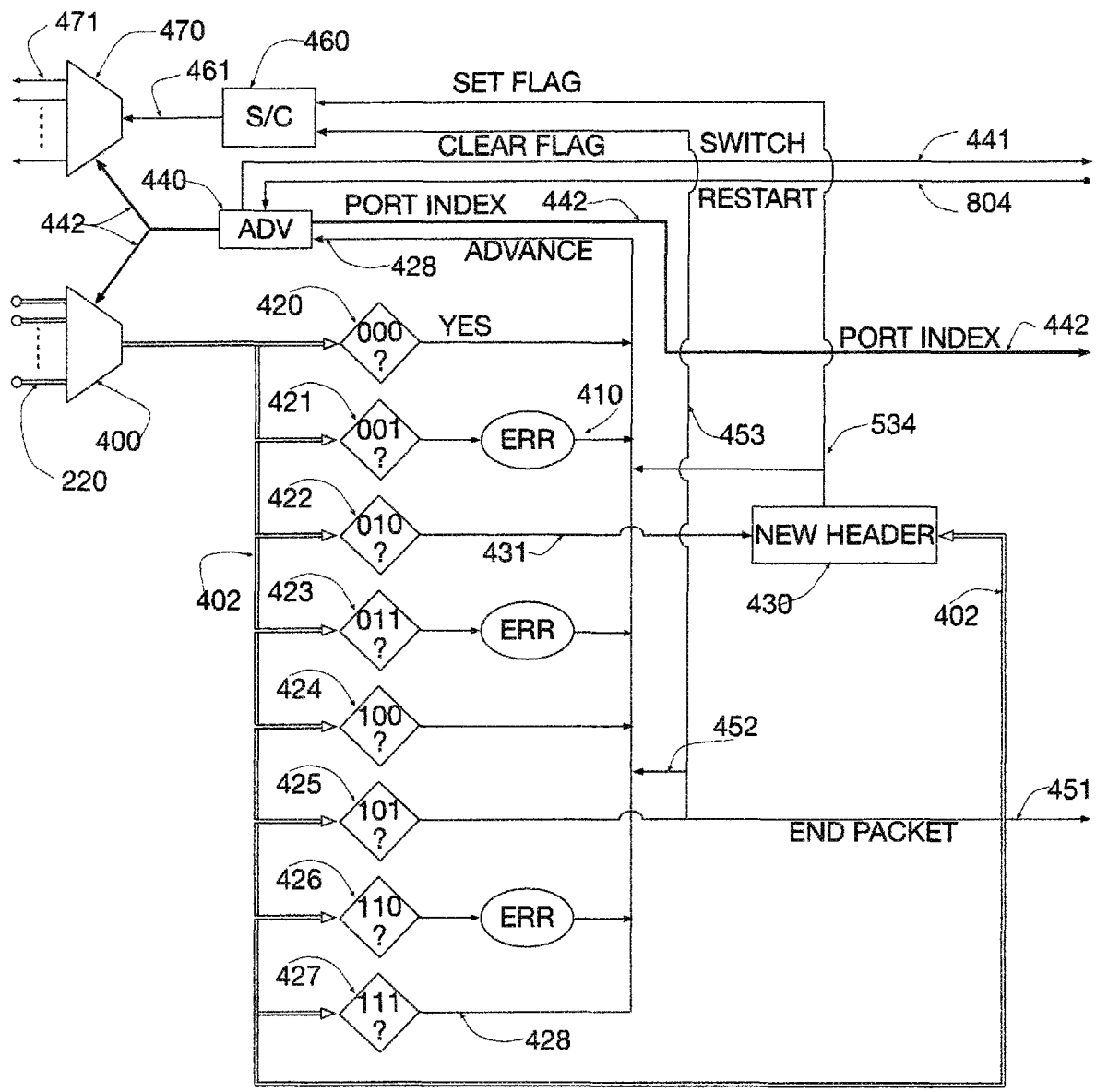
FIG. 4 illustrates an arbitration scanning mechanism.

FIG. 4 is a diagram of the RR scanner that examines each input register 200 in positional order. Each input register 200 is connected to mux 400 via buses 220. Advance mechanism 440 is responsible for controlling mux 400 so that each input register 200 is presented in parallel to the collection of tests via internal bus 402. The tests require comparing the three combined bits including flag 300 and field 301 to each of the eight possible states. For each flit sent to input register 200, there is only one possible state and each state is identified by tests 420, 421, 422, 423, 424, 425, 426, and 427. One and only one of the 8 possibilities may be present in input register 200 or on internal bus 402 at any given instant.

The tests and the resulting actions, which reference the preferred implementation, are described in the following paragraphs. In these tests, a pointer residing in advance mechanism 440 is used to control mux 400 and mux 470. Asserting line 428 increments the pointer so that the contents of the next register appear on internal bus 402 and flag 300 position is accessible to the mechanism.

Test 420 responds to bit pattern 000 which indicates an empty input FIFO 110. The action is simply to advance the pointer in advance mechanism 440 to the next position, allowing the contents of the next input register to appear on internal bus 402.

Test 421 responds to bit pattern 001 which, in this example, is not allowed. The action generates error message 410 and then to advance the pointer in advance mechanism 440 to the next position.

Test 422 responds to bit pattern 010 which identifies a message or packet header flit that has yet to be examined. The action via line 431 is to activate new header mechanism 430. New header mechanism 430 issues a signal on set flag line 534 which advances the pointer in advance mechanism 440 and sets flag 300 so that this position is skipped when next encountered.

Test 423 responds to bit pattern 011, which is not allowed. As above, an error message is generated and the pointer is advanced in advanced mechanism 440 to the next position.

Test 424 responds to bit pattern 100 which specifies an unstructured data flit that follows a header that has been processed by new header mechanism 430. The pointer is advanced in advanced mechanism 440 to the next position.

Test 425 responds to bit pattern 101 which indicates an end-of-packet flit. The response signal on line 451 carries out actions on line 452 to advance the pointer in advance mechanism 440 to the next position via clear flag line 453 to make ready for the next flit from input FIFOs 110.

Test 426 responds to bit pattern 110 which is an error condition. The pointer in advance mechanism 440 is incremented as described above.

Test 427 responds to bit pattern 111 which may indicate a control flit that travels within the message. The pointer in advance mechanism 440 is incremented as described above. Signals to advance the pointer all converge on line 428 which may be viewed as a OR gate. This gate is shown as a distributed structure by line 428.

Advance mechanism 440 carries out the following actions. The circuit particulars are not shown as they are common knowledge and may be implemented in different ways. The pointer internal to advance mechanism 440 is initialized to zero, allowing input register 200 to be examined. With each advance signal on line 428, this pointer is incremented, stepping through all the n input registers and hence through all the n input FIFOs. When the pointer reaches the value n, the RR scanning mechanism halts and advance mechanism 440 issues a command via line 441 to switch scan queues.

When the queue scanning mechanism has terminated, the RR scanner is restarted by setting the pointer in advance mechanism 440 to zero. The signal arrives on restart line 804. Set flag line 534 and clear flag line 453 control circuit 460 which takes the specified set or clear action via line 461 to mux 470. Flag 300 is then set or cleared via lines 471 back to selected input register 200 carried out by a hardware state machine.

Advance mechanism 440 presents the value of the current pointer on port index line 442. The port index is required for carrying out actions, as will be further described. FIG. 4 also summarizes the advance process in a list of steps.

Figure 5:
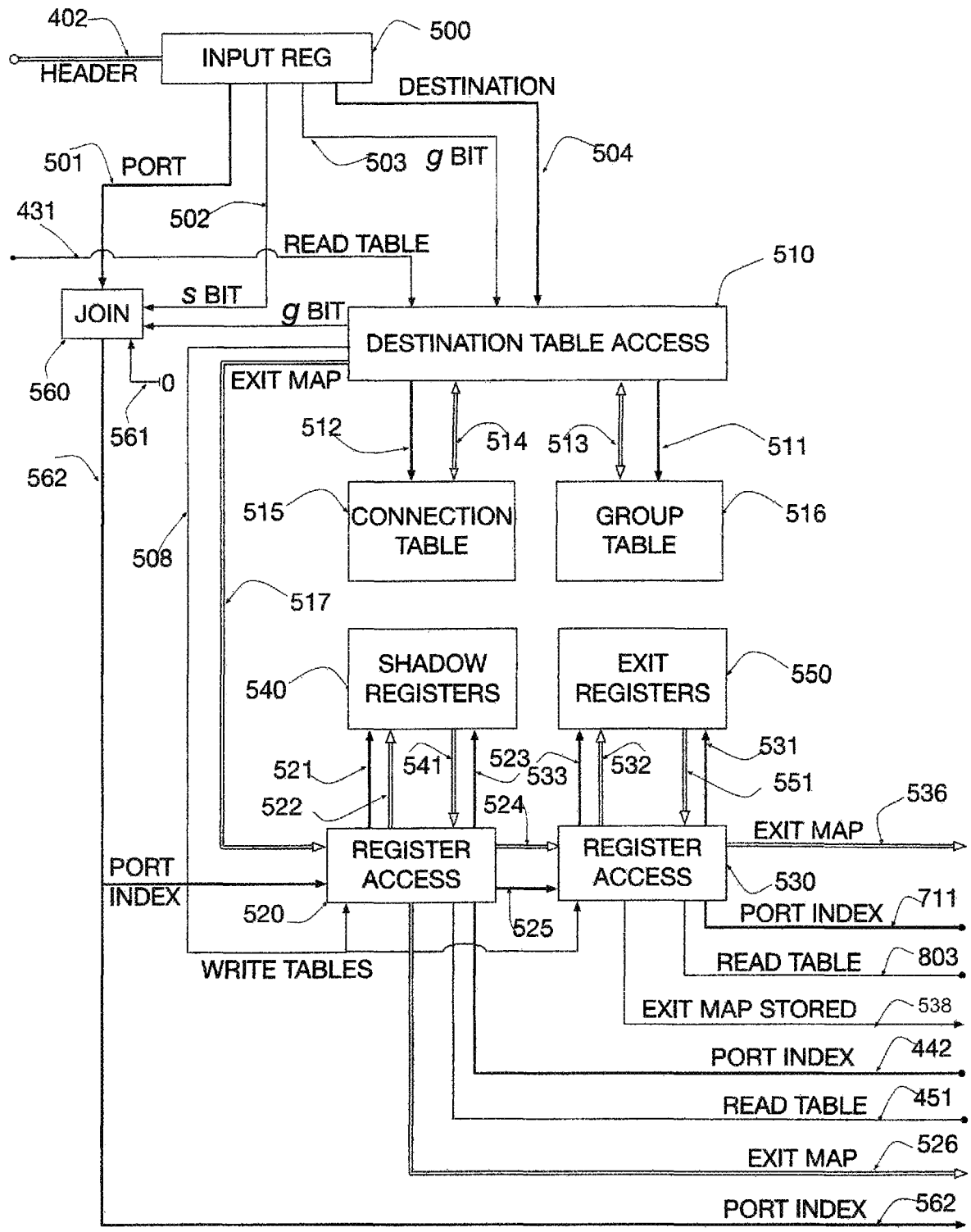
FIG. 5 represents a mechanism activated when a new packet header is identified.

FIG. 5 is a block diagram for processing a new header flit and contains mechanisms for accessing the connection and group tables. Input register 500 is a drop-off point on internal bus 402 from the RR scanner and remains write enabled following system initialization.

RR Advance:
0. Initial start with counter at zero.
1. Increment index counter upon advance signal.
2. Counter controls the two muxes.
3. When counter reaches n, assert line 441 and halt.
4. Counter restarts at zero when restart line 804 is asserted.
5. Sends counter (input index) value over line 442.

The header flit on internal bus 402 selected by mux 400 appears in input register 500 where port field 305 is present on line 501, s bit 303 appears on line 502, g bit 302 appears on line 503, and the contents of destination field 304 appear on destination line 504. This information is presented to table access mechanism 510.

New header signal 431 commands table access mechanism 510 to read connection table 515 if the g bit is zero, or group table 516 if the g bit is set to 1. For g clear or zero, destination line 504 is presented to connection table 515 on address line 512 as a row index and the contents of that row are read out on line 514 and converted to an exit vector with one of its n bits set to indicate which exit port was specified by the destination. For g set, destination line 504 is presented to group table 516 on address line 511 as a row index and the contents of that row are read out on line 513. The resulting information obtained from either table is sent out via line 517 as an exit map specifying which exits or output FIFOs are to be activated for the specified destination.

Double arrow lines 513 and 514 indicate the directional flow of table contents for both the read access (described above) and the table-initialization process (not shown).

The exit map on line 517 is presented to register-array access device 520 and to register-array access device 530 via line 524. The exit map is copied into shadow register array 540 via line 522 with row address on line 521 and into exit register array 550 via line 532 with row address on line 533. Write tables command 508 is asserted when the exit map is present on line 517.

Device 560 joins the multi-bit port index on line 501 with the p, s and g bits on lines 561, 502 and 503, respectively, and presents the augmented port index on line 562. Initially, the p bit is set to zero. The port index is presented to the register-array access devices 520 and 530 with those augmented bits masked off. The port index on lines 562 and 525 then serves as a row address for writing shadow register array 540 and exit register array 550 via address lines 521 and 533 as described above. When the exit map on line 517 has been successfully written into shadow register array 540 and exit register array 550, a ready or "map-stored" signal is generated and presented on line 538 for use by additional mechanisms.

The shadow register array and exit register array are copies of each other made for the purpose of independent read access to avoid race conditions. Shadow register array 540 is read by a request on line 451 representing an end-of-packet condition determined by test 425, as shown in FIG. 4. At that point, the port index appearing on line 442 serves as the row address to read the corresponding exit register in the memory bank according to the address on line 523. The contents of the specified row then appear as the exit map on line 541 which are connected to exit map output line 526 by the register access array 520.

Exit register array 550 is read by request on line 803 originating in the grant mechanism discussed below. This mechanism also presents a port index as the row address on line 711 and is conveyed to exit register array 550 via address line 531. The requested exit register in the memory bank is returned to access register array access 530 on line 551 and is presented by register array access 530 on exit-map output line 536.

Figure 6:
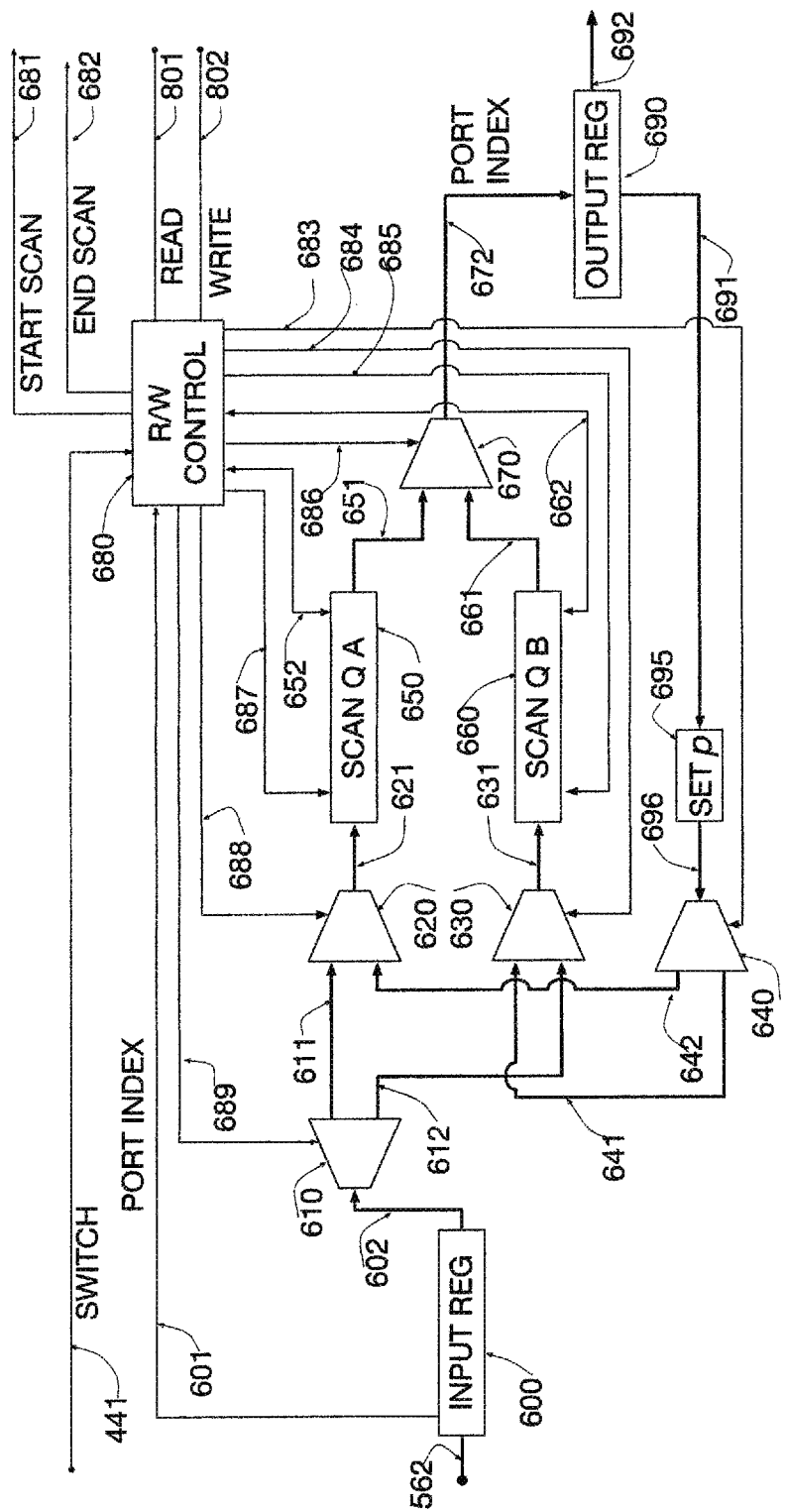
FIG. 6 shows management of the two scan queues.

FIG. 6 illustrates the scan queue mechanism supporting scan queues 650 and 660. The purpose of these scan queue devices is to accept and temporarily store the port indices along with the s and g bits extracted from each packet header presented to input register 200 by input FIFOs 110, as previously described. This augmented port index is present on line 562 according to the new header mechanism of FIG. 5, as previously described. Line 562 carries the index value to input register 600. Input register 600 conveys its contents via line 602 to the input mux 610 for storage in scan queue device 650 or scan queue device 660 when write command 687 or 685, respectively, is issued by controller 680.

Controller 680 is a state machine with two states, a state A and a state B. These states are interchanged from A to B or from B to A each time line 441 from advance mechanism 440 is asserted. In state A, scan queue device 650 is configured to enqueue the augmented index on line 602 from a new header originating on line 562 from FIG. 5, when so commanded. Scan queue device 660 is configured to dequeue an augmented index to output lines 672 into output register 690 which conveys its contents on line 692.

By a series of connected gates (not shown), controller 680 ensures that, while in state A, lines 684, 688, and 689 are asserted ensuring that mux 630 is connecting line 641 to line 631, mux 620 is connecting line 611 to line 621, and mux 610 is connecting line 602 to line 611. This sequence of logic signals ensures that the contents of input register 600 via line 602 are enqueued in scan queue device 650 upon a write signal appearing on line 687 that is provided by line 601 in response to a new index value appearing in input register 600 as described.

At the same time, lines 683 and 686 are not asserted, ensuring that mux 670 is connecting line 661 to line 672 and that mux 640 is connecting line 696 to line 641. This sequence of logic signals ensures that the scan queue device 660 has a value dequeued upon a read signal appearing on line 662 following an external read command on line 801 from the grant mechanism. The index so dequeued is sent to output register 690 and is thereby present on line 691. The index is received by device 695 which sets the p bit in the augmented port index to indicate that the re-queued index has been recognized as pending. Line 696 from device 695 then present the marked index to mux 640. This latter configuration ensures that any dequeued index value may be written back into the same scan queue device 660 upon receiving a command write command on line 685 when triggered by an external signal on line 802 from the grant mechanism.

While in state B, the opposite condition obtains, with lines 683 and 686 being asserted while lines 684, 688, and 689 are not asserted. The result is that mux 610 now connects line 602 to line 612 leading to mux 630 which is configured to connect line 612 to line 631, allowing the input index in input register 600 to be enqueued into scan queue device 660 when line 685 is asserted in response to a write command given on line 601 in response to a new index value appearing in input register 600, as previously described. A read command given on line 801 asserts line 652 dequeuing scan queue device 650 through line 672 through line 651 to mux 670 and via to line 692 to output register 690. Since line 683 is asserted, mux 640 connects line 696 to line 642 to mux 620 which, since line 688 is not asserted, connects line 642 to line 621. A rewrite command may be given on line 802 that asserts line 687 causing the contents of output register 690 to be re-queued into scan queue device 650.

Scan queues devices 650 and 660 are implemented as circular buffers controlled internally (not shown) by three pointers: a head-of-queue pointer p0, a queue-tail pointer p1, and a p1* pointer that contains the value of p1 at the start of the read cycle. When pointer p0 equals pointer p1*, the process of reading is terminated and controller 680 asserts an end-of-scan signal on line 682.

An assertion of line 441 by advance mechanism 440 causes the controller 680 to reverse the roles of the two scan queues as described above. When the controller state has switched, line 681 is asserted to notify the grant mechanism to start processing the appropriate scan queue.

Lines 652 and 662 each convey two signals, read signals from controller 680 and an empty flag from scan queue devices 650 and 660, respectively. These flags are asserted if the corresponding scan queue is empty.

The R/W controller actions are a list of actions taken by controller 680. These actions are the result of a hardware state machine that is not illustrated but whose purpose is concisely described by the figure as (1) changing the input (write) and output (read) selection line 683 through 689 from a state A to a state B condition.

R/W Controller Actions:
1. Switch queues upon clear flag line.
2. Configures mux settings according to the controller state.
3. Issues start scan command to grant control if the selected scan queue is not empty.
4. Issues scan queue read or write signals according to the 801 and 802 inputs.
5. Issues an end scan command when the queue being read has reached the end or is empty.

Figure 7:
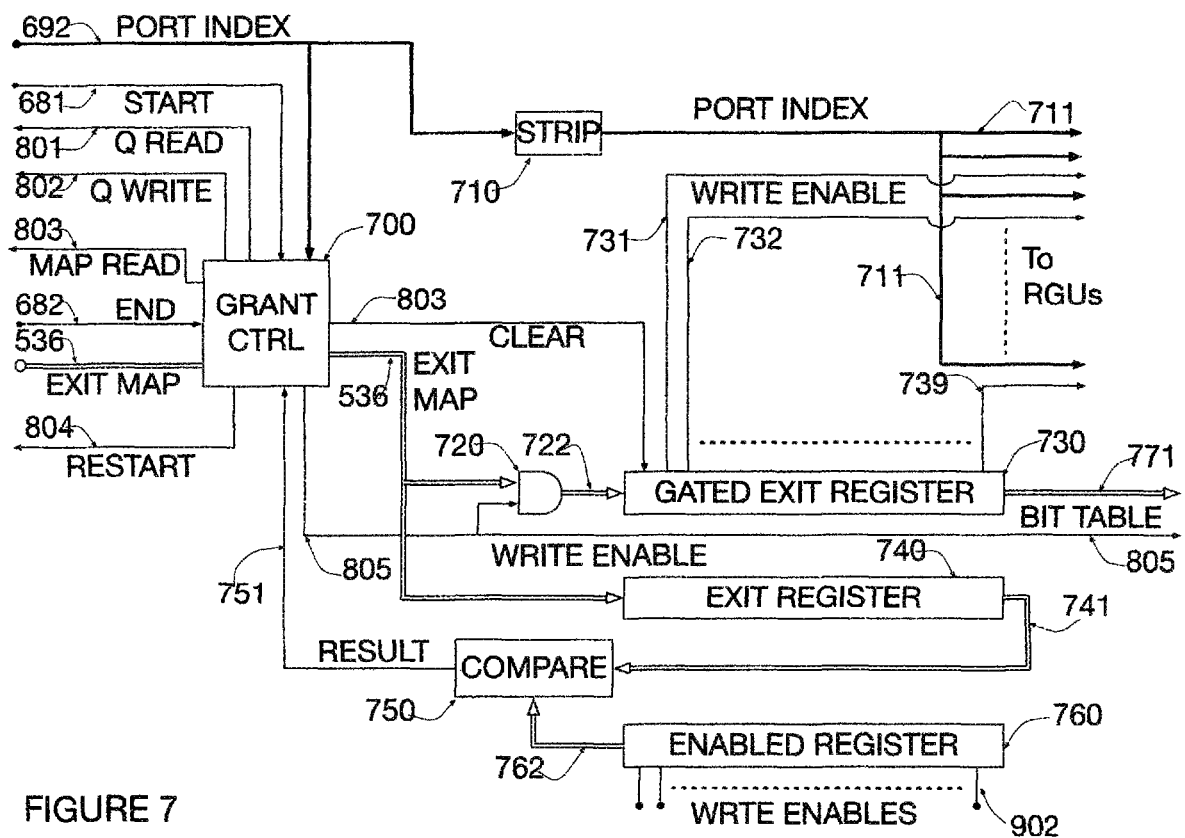
FIG. 7 presents logic of a grant test.

FIG. 7 is a block diagram of the grant test that determines if an input FIFO may start sending its contents to an output FIFO. When grant control 700 receives a start-scan signal on line 681, it issues a read command on line 801 which dequeues an augmented port index from the scan queue that is in the read state as previously described in FIG. 6. The resulting augmented port index is presented on line 692. The port index is presented to device 710 which strips off the s and g bits and places the bare port index on line 711 which comprise a bus that conveys the port index simultaneously to a bit table and all release-gate units as well as to the register access mechanism in FIG. 5 on line 711. The registers receiving information from line 711 are not write enabled at this point as the necessary tests are not complete.

Grant control 700 then issues a map-read request via line 803 to access the exit map corresponding to the port index present on line 711. The corresponding exit map is presented on line 536 to grant control 700 which, in turn, allows the exit map to appear on line 536 leading to gate 720. At the same time, the gated exit register 730 is cleared by line 803. The map on line 536 is also written into exit register 740 where it is compared in device 750 with the contents of the FIFO enabled register 760 that contains a copy of each write-enable flag for each output FIFO connected via line 902. The contents of enabled register 760 are presented to compare device 750 on line 762 to validate availability of the requested output FIFOs according to the map in exit register 740 whose contents are presented on line 741. The comparison effects a bit AND of exit register 740 with enabled register 760. If the result of this operation is equal to the contents of exit register 740, the result True is presented on line 751; otherwise False is sent.

Grant control 700 then examines the result on line 751 and, if the comparison is valid, issues a write enable on line 805 which opens gate 720 so that the exit map is read into gated exit register 730 via line 722. Each requested exit then presents a True or logical 1 on each of lines 731, 732, and 739 with any of the remaining n lines presenting a False or logical 0. The True conditions serve as write enables to those RGU registers receiving the port index on line 711, allowing registers in those and only those RGUs to accept the value of the port index. A False condition activates line 802 commanding the index to be re-queued into the appropriate scan queue in FIG. 6 and updating the pending register.

The contents of gated register are available on line 771 to a bit memory along with access command line 805 to store the bit configuration of the gated exit register 730, enabling an exit-port to input-port mapping responsible for advancing the identified input port on line 1111, for example, as explained in the discussion for FIG. 2. The operation of this inverse-mapping function will be further described.

If the end of scan on scan queue devices 650 or 660 is reached in response to read command line 803, the mechanism of FIG. 6 replies with an end-of-scan signal on line 682, terminating the progress of the grant process until restarted by asserting line 681. Signal restart line 804 is generated by the scan process described below.

Figure 8A:
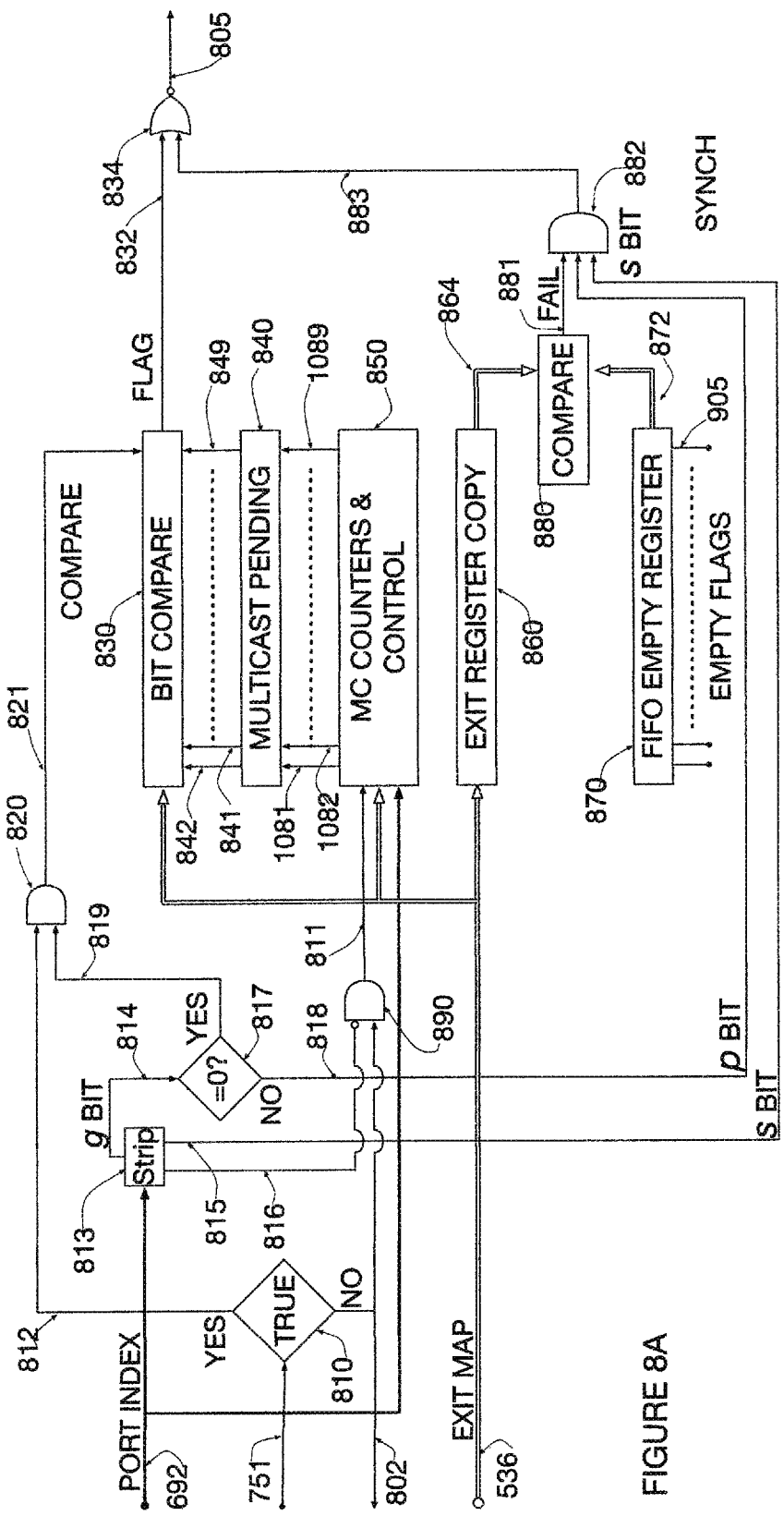
FIG. 8A details a control mechanism for the grant process.

FIG. 8A shows the logic resulting in asserting line 805 as True to effect write enables lines 731, 732, and 739 as determined by the bits set in the exit map in gated exit register 730 which, in turn, enables input FIFOs 110 to advance through the selected RGUs to the output FIFOs.

During the grant process discussed above for FIG. 7, the augmented port index is present on line 692. Device 813 extracts the g bit value to line 814, the s bit value to line 815, and the p bit value to line 816. Result flag 751 is tested in gate 810 which assert line 812 if compare test 750 results in True; otherwise line 802 is asserted which serves as a command to enqueue the index into a scan queue of FIG. 6. When compare test 750 fails, asserted line 802 also is ANDed in device 890 with the complement of the p bit and provides signal 811 to multicast pending control 850 to update the multicast pending register 840 through lines 1081, 1082, and 1089. The values of each of the n bits in multicast pending register 840 are available to bit compare 830 via lines 841, 842, and 849. The result is that any requested exits that are not granted are marked in multicast pending register 840 by the multicast pending control 850 which has access to the exit map on line 536.

When compare test 750 returns True on line 751, line 812 out of gate 810 is taken. The g bit is tested in gate 817. If g is zero, indicating a unicast transmission, line 819 is asserted so that gate 820 receives a True on line 819, thus transmitting a True on line 821. Line 821 then requests a bit AND comparison between contents of multicast pending register 840 and the exit map presented on line 536. If the unicast request represented by port index on line 692 has its single exit contained in exit map on line 536, bit compare 830 will assert line 832 as a logical True. When presented on line 832 to OR gate 834, the negation (a False in this case) appears on output line 805 as False indicating that the corresponding path is in use. Otherwise output line 805 is True indicating a write enable, indicating that the corresponding path to output output FIFO 150 is free for the requested unicast transmission. Note that multicast transmissions are not tested in this circuit.

Under low-traffic conditions, simultaneous release is an inherent feature of parallel multicast. However, certain exits may become busy during periods of high activity, thus delaying the release of a multicast transmission to some of its requested exits but not others. Setting s bit 303 ensures that the packet is released simultaneously to all exits specified by the multicast destination. This is accomplished by comparing the exit map in register 860 with FIFO empty register 870. Output FIFO empty flags 905 are copied into register 870 allowing compare device 880 to compare the two registers through lines 864 and 872. A bit AND of the two registers determines if all exits marked in register 860 lead to empty output FIFOs marked in empty register 870. If the result of the comparison in device 880 fails, indicating that some of the requested paths are busy, a logical True appears on line 881.

If both the g bit is set (not zero) and the s bit is set (forcing a simultaneous release), lines 816 and 818 will both present a logical True to gate AND 882. Since compare device 880 is presumed to have failed in this case, gate 882 will present a logical True on line 883 to OR gate 834. Line 805 from gate 834 will then register the negation of this value and contain a logical False which will not assert the write enable for gate 722, meaning that the path from the requesting input FIFO 110 will not open, with the result that the header will remain in that FIFO.

If compare device 880 succeeds in that bits set in register 860 match those set in register 870, a logical 0 or False will appear on line 881. This will result in line 805 asserting True to set the write enable for gate 722 and allowing the path from input FIFO 110 to convey flits on data buses 100, 120, 140 from the input in question to the RGUs and thence to the specified output FIFOs. The latter portion of this path from input to output is described below.

Figure 8B:
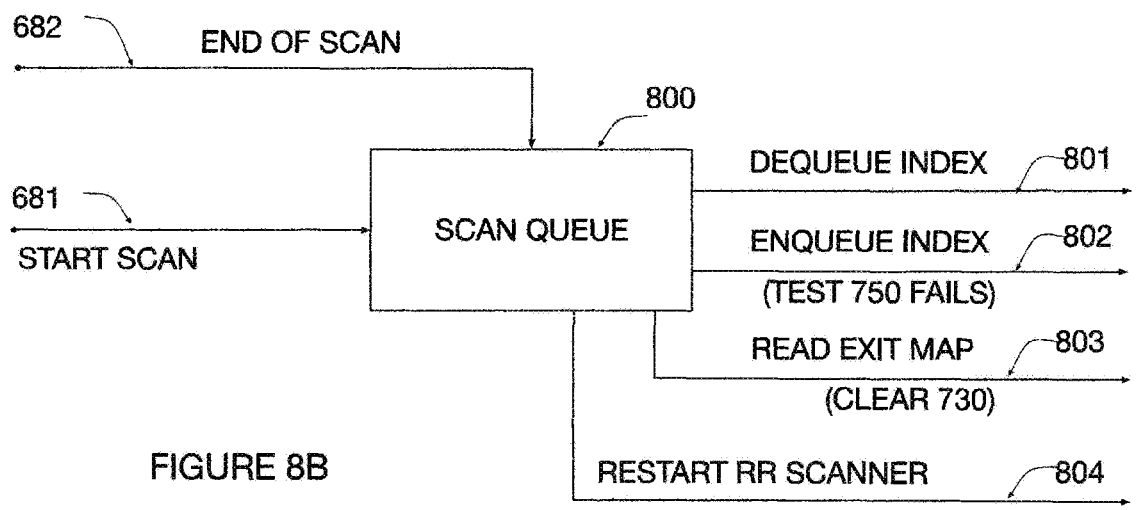
FIG. 8B illustrates main control signals for granting a packet release.

FIG. 8B is a diagram of the scan queue controller mechanism 800 that determines the signals controlling grant control 700 described above. Input line 681 from the scan queue mechanism in FIG. 6 provides the start-of-scan signal which initiates the steps listed in FIG. 8B. Input line 682 from the same scan queue mechanism provides the end-of-scan signal which terminates the repeating sequence listed in FIG. 8B. When the sequence of steps terminates, line 804 is asserted which then restarts the RR scanner described in FIG. 4 which was previously halted as described above.

During the loop listed in FIG. 8B, line 801 is asserted to dequeue a port index, line 803 is asserted to read an exit map, to clear gated exit register 730 and initiate comparison test 750 (line not shown). If the comparison fails, line 802 is asserted to write the port index back into scan queue devices 650 or 660 as described above.

Scan Queue Action:
Upon start scan (line 681),
While not End Scan:
1. Dequeue port index (801)
2. Read exit map and clear gated map register (803)
3. Compare map register to enabled register (750)
4. Assert write enable if compare valid
5. else re-queue port index (802)
Restart RR Scanner (804).

FIG. 8B is a concise summary meant to clarify the actions described in FIG. 8A and are not meant as an exhaustive recapitulation of the above discussion. It will be evident to one of skill versed in the art of digital logic how to supply details about specific implementations of the overall logic, methods, and operations described above. While such details are relevant to realizations of the embodiments of this disclosure, they do not require undue experimentation.

Figure 9:
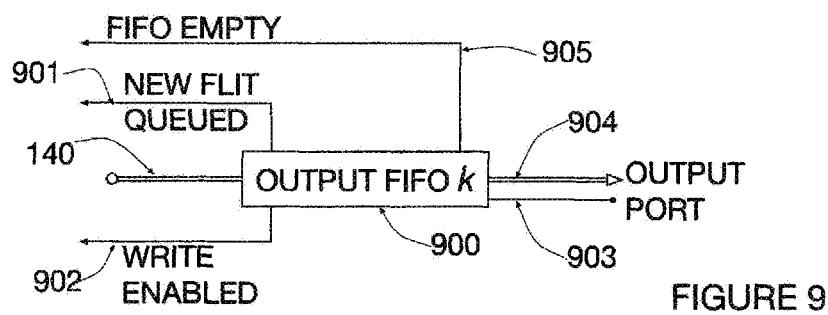
FIG. 9 shows signals associated with an output FIFO.

FIG. 9 shows the status signals associated with an output FIFO 900 (corresponding to output FIFOs 150 of FIG. 1) that are needed to carry out the functions described above. Data bus 140 presents flits to be enqueued in FIFO 900 which is in a write-enabled state following system initialization and remains so unless flow control is exercised by conditions not illustrated. This write-enable state appears on line 902. When a flit is written into output FIFO 900, line 901 is asserted and is used to access the bit memory as described below. Line 905 (FIFO empty) from output FIFOs 150 are required to ensure simultaneous release of a multi-cast transmission as described above. Bus 904 leads to the output port mechanism (not shown or described) while line 903, that controls the write-enabled signal on line 902, indicates whether the exit port or mechanism is ready to receive the next flit.

Figure 10A:
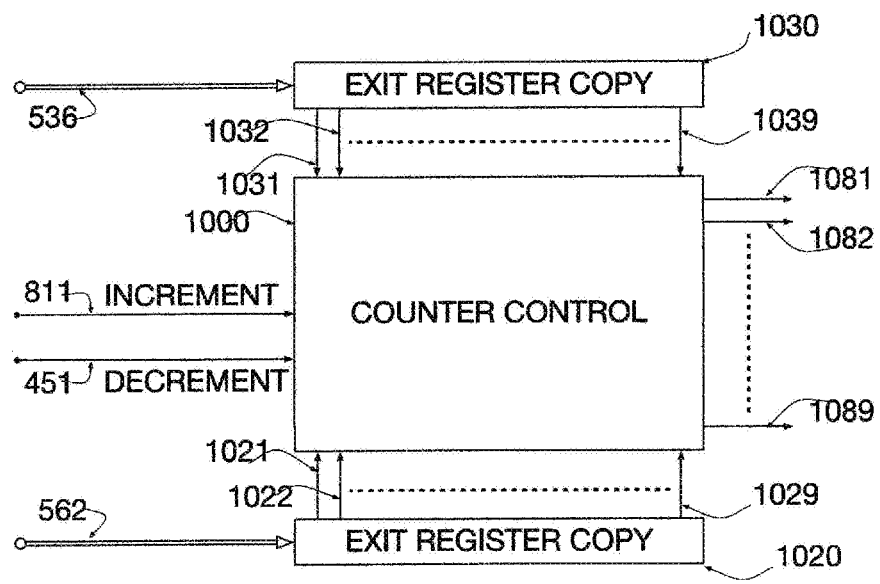
FIG. 10A is a diagram of a multicast counting and control mechanism.
Figure 10B:
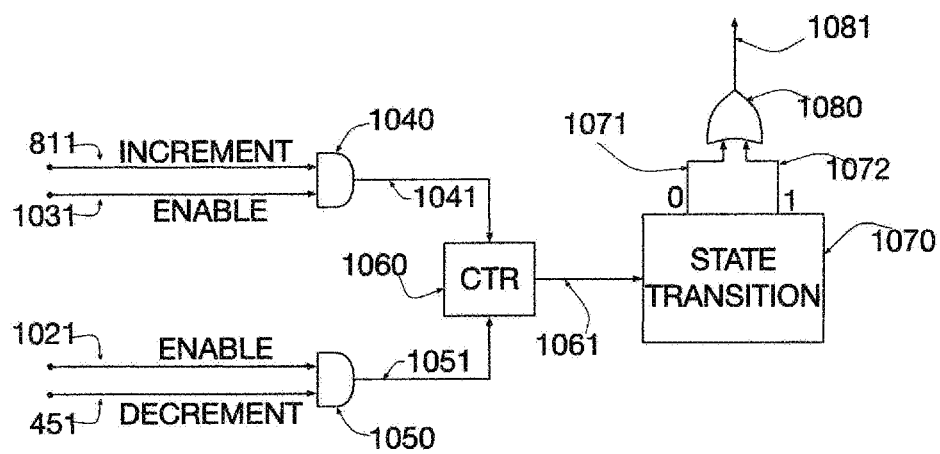
FIG. 10B illustrates the action of the counter control of FIG. 10A.

FIGS. 10A and 10B illustrate the action of the multicast control and counter mechanism referred to above under the discussion of FIG. 8A. An exit map representing a new header is written into register 1030 via line 536 when requested by the grant control of FIG. 7. The n lines 1031, 1032, and 1039 convey the n individual bit values from register 1030 to counter control 1000. In a similar manner, an exit map representing a packet-terminating flit is written into register 1020 via lines 562 when requested by the RR scanner of FIG. 4. The n lines 1021, 1022, and 1029 convey the individual bit values from register 1020 to counter control 1000.

Asserting line 811 in response to a new header sends a signal to increment each of the n counters in counter control 1000. Referring to FIG. 8A, line 811 is asserted only if compare test 750 fails and the p bit is clear. Counter 1060 is incremented for each busy exit that is free, thus reserving that exit for the pending transmission.

Asserting line 451 in response to an end-of-packet detected by test 425 of FIG. 4 sends a signal to decrement each of the n counters in counter control 1000. The exit map extracted from register array 540 by the same signal 451 and returned on line 562 corresponds to the port index placed on line 442 during the RR scanning process that identifies an end-of-packet flit. The exit map on line 526 then contains a record of those exits that are in use and are to be released.

Since a new header cannot be released by write-enable line 805 unless all requested exits are free, the exit map on line 536 will have no bits in common with the exit map on line 562. The result is that any particular counter 1060 in FIG. 10B will be incremented, or decremented, or left unchanged by the action of counter control 1000 with no possible conflict or race condition.

FIG. 10B shows the configuration of one of the n counters in counter control device 1000, counter 1060. Counter increment 811 appears on all n counters, as does counter decrement 451. Each counter is enabled by lines 1021 and 1031 from registers 1020 and 1030, respectively. The AND gates 1040 and 1050 effect either incrementing or decrementing counter 1060 via lines 1041 or 1051, respectively. State transition device 1070 monitors the change in state of counter 1060 by connection 1061. Device 1070 is configured to issue a 0 on line 1071 if the counter value changes from 1 to 0 in response to a decrement signal on line 451. A 1 is issued on line 1072 if the counter value changes from 0 to 1 in response to an increment signal on line 811. The particular mechanism is not shown as there are several equivalent implementations that would be well known to practitioners of skill in the art of digital circuit design.

For the particular counter shown in FIG. 10B, lines 1071 and 1072 are ORed together in gate 1080 and presented on output 1081. Seen as a parallel functioning device, counter control 1000 then provides updated multicast-pending signals on lines 1081, 1082, and 1089 to multicast pending register 840 of FIG. 8A.

Figure 11:
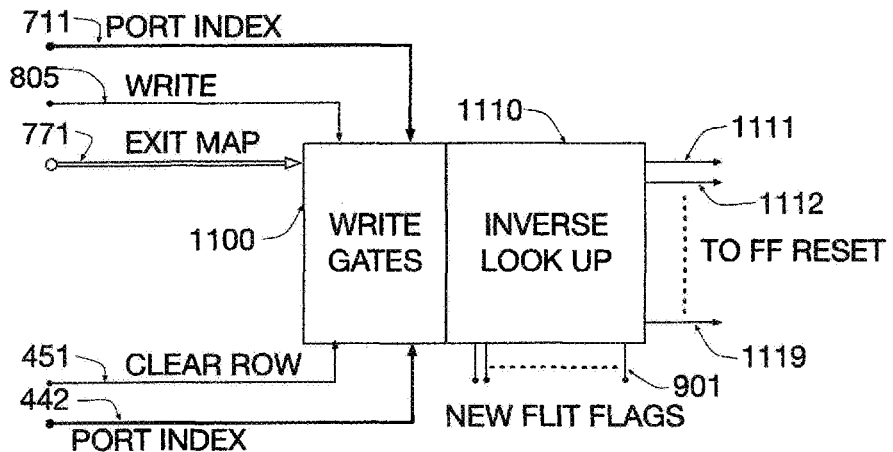
FIG. 11 illustrates producing the input-FIFO advance signal.

FIG. 11 is a diagram of the bit-memory, inverse-lookup mechanism. When a new header on an input port is released by the process, as previously described in relation to FIGS. 4, 5, 6, 7, 8A, and 8B, port index bus 711 is present. Such release is triggered by asserting input line 805, as previously described. Input line 805 and port index bus 711 are conveyed to gate control 1100 along with the exit map from the released header on line 771 from register 730 in FIG. 7. The register contents on line 771 are written into a row of bit memory 1110 by gate control 1100 according to the specified row on port index bus 711 and provide a copy of the exit map of the released header.

A signal on line 451 along with a port index on line 442 request gate control 1100 to clear the specified row, effectively terminating the packet as required by end-packet test 425 in FIG. 4.

Each output FIFO 150 or 900 asserts its new-flit queued flag 901, which places an effective bit address on corresponding input lines to bit memory 1110. The output of bit memory 1110 is then present on one of output lines 1111, 1112, and 1119, if the corresponding bit is set in a column addressed by a particular flag 901. The result is that the device as shown in FIG. 11 serves as a many-to-one mapping that specifies a single input port on one of lines 1111, 1112, and 1119 in response to a multicast or unicast header reaching output FIFOs 900 specified by destination field 304. This unique signal generated when a new flit is queued into an output FIFO resets flip flop 210 in FIG. 2, and commands associated input FIFO 110 to advance.

Each row of switches specified by row index on port index bus 711 are set or closed according to the exit map presented on line 771, and all switches in a row index on input line 442 are cleared or opened when line 451 is asserted. A flag asserted on any of the column flags 901 will then appear on the corresponding row output 1111, 1112, and 1119.

Figure 12:
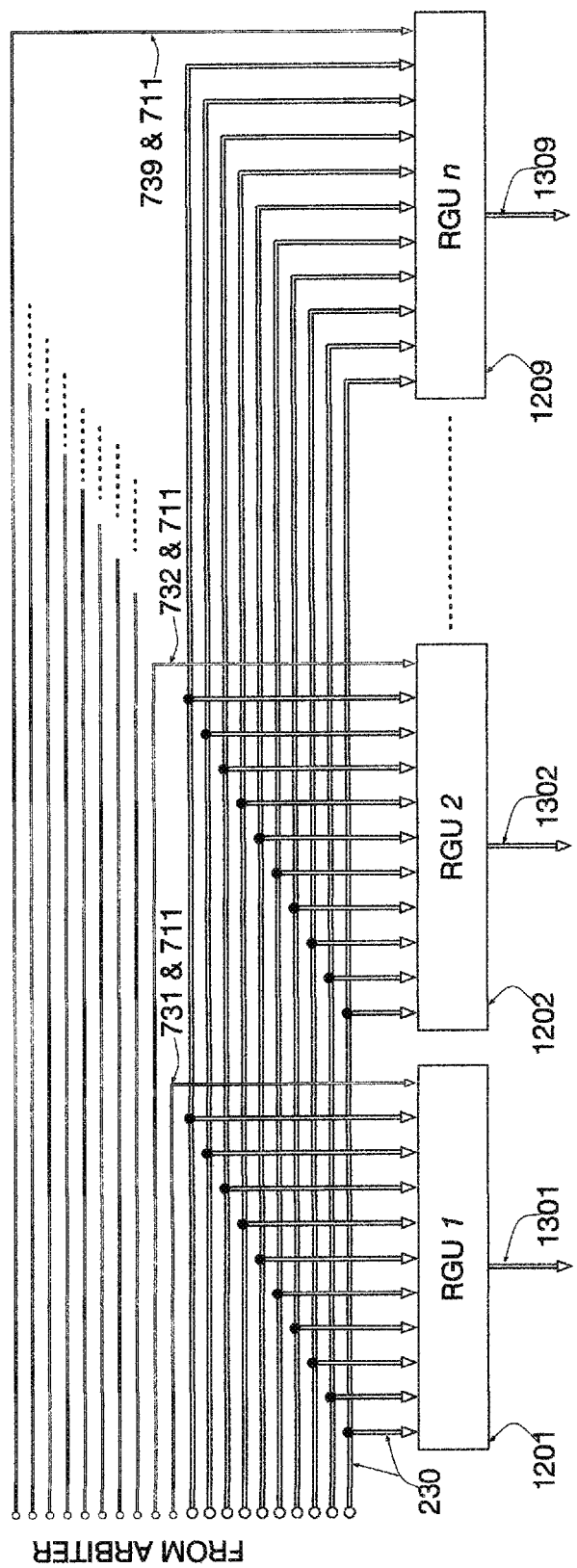
FIG. 12 shows connections to the release gate units.

FIG. 12 shows the connections of the n input buses from an arbiter, as described in FIG. 1, to RGUs 1201, 1202, and 1209 as lines representing bus 230. Each of the n buses connects to a unique register on each of the RGUs. Furthermore, port-index bus 711 is presented to each of the RGUs along with write-enable lines 731, 732, and 739, respectively. Line 1301 from RGU 1201, line 1302 from RGU 1202, and line 1309 from RGU 1209, each connect the bus complex from each of the n input FIFOs 110 to their respective output FIFOs 150 (as shown in FIG. 9).

By the configuration of the logic represented in the above figures, a maximum of one of inputs 230 may be connected to any of output lines 1301, 1302, and 1309 at any one time.

Figure 13:
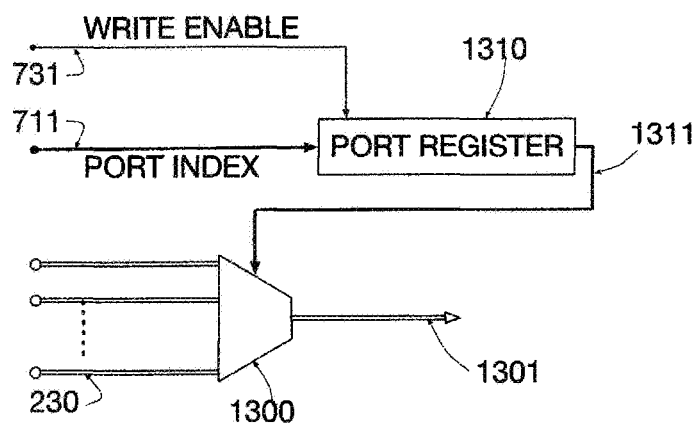
FIG. 13 is a block diagram of a release gate selection process.

FIG. 13 provides a more detailed explanation of the selection process effected by each RGU. Bus 230 from each input FIFO 110 is present on mux 1300 in each of RGUs 1201, 1202, and 1209. When a header is released, as previously described in relation to FIG. 7, one or more of the write-enable lines 731, 732, and 739 is asserted, allowing port index bus 711 present on all of the RGUs to be read into port register 1310 in each RGU so addressed. Register 1310 then provides a port-index value via lines 1311 to mux 1300, which then connects input bus 230, specified by that unique value, to RGU output line 1301. FIG. 13 illustrates a particular RGU with output line 1301 but is meant as a proxy description of the entire set of n RGUs with output lines 1301, 1302, and 1309.

Figure 14:
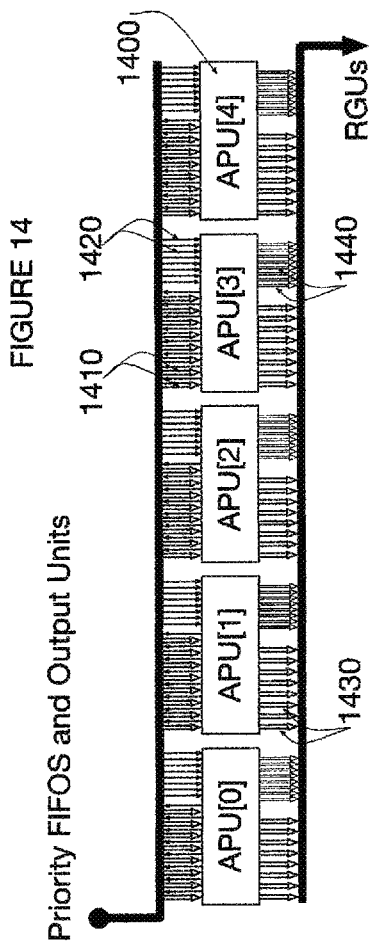
FIG. 14 illustrates an arbitration layer for a five level multi-priority system.

FIG. 14 illustrates an arbitration layer showing APUs 1400 each coupled to inputs 1410 from the Priority FIFOs (labeled but not shown in this figure). In this example there are five APUs 1400, one for each priority, but embodiments of the disclosure are not limited to one, two, three, four, five or any particular number of priorities. Each of APUs 1400 is also coupled to Output FIFOs ready flags 1420 from the Output Layer (labeled but not shown in this figure), advance signals to Priority FIFOs 1430 and release signals 1440 to the RGUs (labeled but not shown in this figure).

A multiple-priority system, where each packet header may specify a particular priority, requires an arbitration mechanism, as previously described. Each of the input processing units sends a packet of the specified priority to an input FIFO reserved for that priority. From that point, each priority path with data bus 100 from the input processing units to input FIFOs 110, through arbiters 130 and thence to output FIFOs 150, is independent from other priority paths.

Each such arbiter is self-contained with its own scanning mechanisms, as previously described. This includes connection tables 515 and group tables 516, as well as register arrays 540 and 550, and access devices 520 and 530. Thus, FIGS. 2 through 13 each show a separate and independent priority-specific arbitration process. A multiple-priority system can include two arbitrations mechanisms (arbiters). A multiple-priority system can include three or more arbitrations mechanisms and embodiments of the disclosure are not limited to any particular number of arbiters.

Each arbiter contains several scan mechanisms that operate in concert with each other. The main scan process is a round-robin mechanism, as shown in FIG. 4, which examines each of the arbiter's input registers 500 in a sequential fashion. The scanner starts with the first register by setting advance mechanism 440 pointer to 0 and incrementing the pointer by 1 after each scan step. When the pointer reaches n, where n is number of inputs to the arbiter, the scanner halts until it is restarted at 0. The arbiter is initialized in a state with scan queue 650 receiving port indices from and with the pointer set to 0.

One of scan queue 650 or scan queue 660 receives the scan index (or pointer value) when a packet header is identified by test 422. Packet identification includes examining the first three bits of the 67-bit input register of flag 300. When a new packet header is identified by its signature, flag 300 is set to 1 so that the register will be skipped during any subsequent scan and the pointer value (input-port index) is queued in receiving scan queue 650 or 660. The g and s bits and the destination field are read and the corresponding exit map is shown in FIG. 5. This exit is map is conveyed to the several map or exit registers by lines 536. To prevent a packet from leaving the device back to the entrance port, the bit specified by the port field must be cleared in the exit map (not shown). The pointer is then incremented and the next register is examined. When the pointer value equals n, the RR scanner halts, and the receiving scan queue is switched from scan queue 650 to scan queue 660 or from scan queue 660 to scan queue 650, as required.

Independently of the state of the RR scanner, the non-receiving scan queue is processed to determine if a packet present in an input register may be released to the selected output FIFO. Suppose scan queue 650 is the non-receiving scan queue so that scan queue 660 is receiving input indices from the RR scanner. If scan queue 660 is empty, its state is marked as finished. If not empty, each entry is examined starting with the head of the queue. An input index is dequeued and the corresponding exit-register contents are compared to the FIFO enable register that contain the state of the n output FIFOs which are presented to each arbiter.

A grant test, independently operating from, but initiated by, an end-of-scan signal from the RR scanner, is performed, and the contents of exit register 740 are compared with the contents of enable register 760. If the result is identical to register 740 contents, then the packet in input register 500 is released by placing the value of the port index on the release line for each line marked by a bit set in the exit register and by setting the corresponding enable line. This write-enable signals the receiving RGU to queue the flit present on the RGU's input into the receiving output FIFO and to notify the input FIFO whose flit has been released to advance. The process allows an arbiter to grant simultaneous releases to multiple inputs so that up to n inputs may be transmitting to corresponding n output FIFOs at any time and in parallel.

If compare test 750 fails, the index is re-queued at the tail of the scan queue so that the index may be re-examined on the next pass. When all entries in a scan queue have been examined, the queue state is marked as finished. If the advance pointer equals n and the active scan queue is marked finished, the advance pointer is set to 0 and the RR scanner restarts with the receiving scan queue set to the one that has just completed its check sequence. This process involving the RR scanner and the two scan queues continues indefinitely in the coordinated fashion described.

A multicast packet that is not released by the grant test will remain in the arbiter's input register until the test passes. For example, if a packet being tested has a bit set in its exit map that is also set in the enable register, that packet will remain in the input register until such time that the test passes. Since a unicast packet requires only one bit to match in the grant test, it has a decided advantage over a multicast packet with several bits set in its exit register. To prevent undue delays for a multicast packet, an additional mechanism must be included in the arbitration process.

Associate a set of n counters with each arbiter. When a packet is released to output during examination of a scan queue as shown in FIG. 8A, all counters represented in the exit map are incremented. When an end-of-packet is detected, the corresponding counters represented in the exit map are decremented. If a particular counter is zero, the corresponding bit in Multicast Pending register 840 is clear, otherwise that bit is set. This register is accessed during a scan when a unicast packet is tested. If the corresponding bit in the register is set, the unicast packet is delayed since the multicast packet waiting at the marked input has temporal priority.

A multicast packet may be marked synchronous by setting the s-bit in the packet header. This ensures that the both packet header and tail are released to the specified exit ports at the same time. The mechanism to accomplish involves examining the s bit. If this bit is set along with the g bit, the grant test of FIG. 8A involves a test of the output FIFO empty flags against the contents of the exit map. If any of the output FIFOs selected by the exit map are not empty, the header in question is not released. If the s bit is clear for a multicast request, the release to the specified exit ports is synchronized in the cases of low traffic where the probability of a delay in an exit channel is low. To guarantee synchronized exits, the s bit should be set.

Embodiments of this disclosure break new ground in interconnects, specifically for true multicast where endpoints receive the same message at the same time without requiring multiple transmissions. In a star topology, the "star" is a generic term for multiple servers or endpoints connected to a single distribution device or interconnect. Embodiments of the disclosure include multiple internal data buses that distribute data where there is one such internal bus for each input to the interconnect and all devices needing that information are drop points along that bus; that is, the same information is simultaneously on all RGUs as shown in FIG. 2, however a particular datum is not used unless the arbiter passes an exit code and a write enable to a particular RGU.

An advantage of embodiments of the disclosure is that the number of internal connections reduced by an order of magnitude or more. For instance, the number of internal connections is approximately 8% of that in a 24-way interconnect. This major reduction in connections enables interconnects with a large number (up to and beyond 256) of connections and allow a reduction in circuit size to something small enough to go into a microprocessor chip. This important discovery will relieve chip manufactures of the major bottlenecks in scaling up chips to multiple processors.

Specifically, embodiments of the disclosure include a streamlined process of treating multicast and unicast traffic on an equal and unbiased basis with lower latency and higher throughput. Designs that include large fan-outs and equally large fan-ins involve a number of connections proportional to n-squared where n is the number of inputs. In the present design, the number of connections is proportional to n and represents a materially large reduction in connections.

Embodiments of the disclosure can include true, parallel multicast which has never before been available in a star topology. All of today's interconnects (data centers, cloud computing, parallel computing, high-performance computing, etc.) are based on star configurations.

Embodiments of the disclosure can include simultaneous and coordinated release of multicast transmissions is a novel and nonobvious feature of embodiments of this disclosure. Embodiments of this disclosure can simultaneously release all of the contents of the packets to the output FIFOs and to all of the exits.

Embodiments of the disclosure can be based on internal buses that convey information to all points that might possibly make use of it. Devices at such terminal points (e.g., RGUs and various registers illustrated in the drawings) are enabled to make use of this information according to requirements of each individual message as it is received and processed by the hardware.

The need for virtual output queues and controlling or monitoring hardware and crossbar switches or their equivalent arrays of gated multiplexers with the necessary large fan-outs and fan-ins to ensure n×n connectivity are no longer required with embodiments of the disclosure. The device shown in FIG. 11 can be interpreted as a small crossbar memory on the bit level instead of interconnecting multiple wide buses.

Embodiments of the disclosure can include fewer gates resulting in lower latency and higher throughput.

Embodiments of the disclosure can include a bus structure that results in vastly reduced connections and, therefore, much smaller footprint, lower power, and faster operation including lower latency and higher throughput.

Embodiments of the disclosure can include the coordinated and cascaded scanning approach (e.g. FIGS. 4, 5, 6, 7, 8A, and 8B) involving linked scans operating in parallel results in faster response to messages. Again, the benefits include lower latency and higher throughput.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations.

The invention claimed is:

1. A method, comprising:
operating a parallel multicast star topology data network including:
a plurality of input buffers;
a first arbitration mechanism coupled to the plurality of input buffers, wherein the first arbitration mechanism comprises a plurality of registers operatively connected to a round robin scanner;
wherein the plurality of registers is further coupled to the plurality of input buffers;
a plurality of output buffers coupled to the first arbitration mechanism;
a plurality of interconnect exits coupled to the plurality of output buffers;
generating a set of fields for a multicast message in the plurality of registers;
testing the set of fields by the round robin scanner;
simultaneously releasing all packet contents of the multicast message to the plurality of output buffers, when all packet contents are ready for release from the first arbitration mechanism; and,
simultaneously releasing all packet contents of the multicast message from the plurality of output buffers to the plurality of interconnect exits.

2. The method of claim 1, further comprising a second arbitration mechanism coupled to the first arbitration mechanism, wherein the parallel multicast star topology data network supports at least two priorities.

3. The method of claim 2, further comprising a third arbitration mechanism coupled to both the first arbitration mechanism and the second arbitration mechanism, wherein the parallel multicast star topology data network supports at least three priorities.

4. The method of claim 1, wherein simultaneously releasing all packet contents of a multicast message to the plurality of output buffers includes coordinating using the arbitration mechanism when all packet contents are ready for release.

5. The method of claim 1, further comprising:
coordinating using the arbitration mechanism when all packet contents are ready for release; and,
wherein the step of coordinating further includes cascaded scanning with a set of linked scans operating in parallel.

6. The method of claim 1, further comprising treating a unicast message on an equal and unbiased basis compared to the multicast message.

7. An apparatus, comprising:
a parallel multicast star topology data network including:
a plurality of input buffers;
a first arbitration mechanism comprising a plurality of registers operatively connected to a round robin scanner;
wherein the plurality of registers is coupled to the plurality of input buffers;
a plurality of output buffers coupled to the first arbitration mechanism;
a plurality of interconnect exits coupled to the plurality of output buffers;
wherein a set of fields is generated for a multicast message in the plurality of registers;

wherein the round robin scanner tests the set of fields; and, wherein when packet contents of the multicast message are ready for release from the first arbitration mechanism then then all of the packet contents are simultaneously released to the plurality of output buffers and then simultaneously released to the plurality of interconnect exits.

8. The apparatus of claim 7, further comprising a second arbitration mechanism coupled to the first arbitration mechanism, wherein the parallel multicast star topology data network supports at least two priorities.

9. The apparatus of claim 8, further comprising a third arbitration mechanism coupled to both the first arbitration mechanism and the second arbitration mechanism, wherein the parallel multicast star topology data network supports at least three priorities.

10. The apparatus of claim 7, wherein each of the plurality of input buffers includes a first in first out buffer.

11. The apparatus of claim 7, wherein each of the plurality of output buffers includes a first in first out buffer.

* * * * *